Figure 1:
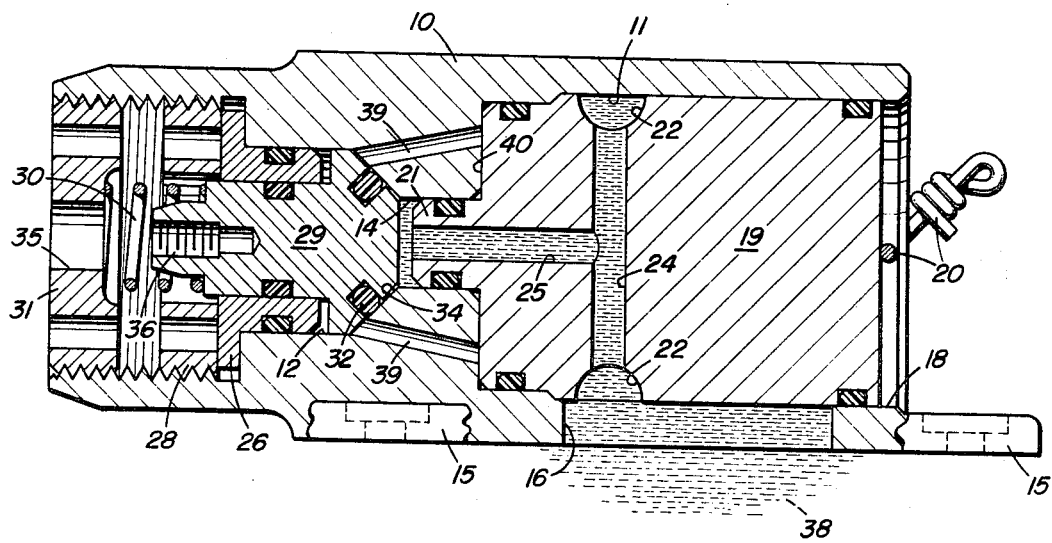

Nov. 26, 1968 — T. J. O'CONNOR — 3,412,743
RELIEF VALVE
Filed Aug. 30, 1963

INVENTOR.
Timothy J. O'Connor
BY
ATTORNEYS

United States Patent Office 3,412,743
Patented Nov. 26, 1968

3,412,743
RELIEF VALVE
Timothy J. O'Connor, Rockville, Md., assignor to the United States of America as represented by the Secretary of the Navy
Filed Aug. 30, 1963, Ser. No. 305,891
7 Claims. (Cl. 137—70)

The invention described herein may be manufactured and used by or for the Government of the United States of America for governmental purposes without the payment of any royalties thereon or therefor.

This invention relates to relief valves, and more particularly to pilot operated relief valves which are self-energizing.

The present invention will find general application wherever relief valves are utilized and specific application as a flooding valve for underwater ordnance items. It is sometimes desirable to make provision for the flooding of underwater ordnance items for various reasons. For example, when an underwater ordnance item is subjected to water pressures in excess of the design pressures, it may be desirable to flood the ordnance item to effect a disarming thereof in order to preclude the possibility of inadvertent detonation of the weapon brought about by collapse of the weapon housing under the excessive pressures. Also, in the case of weapons which may be carried in confined spaces such as the torpedo tubes on submarines, it is desirable to flood the weapon when excessive water pressure is encountered to preclude jamming of the weapon in the torpedo tube due to the collapse of the weapon casing and also to preclude inadvertent detonation of the weapon.

In the past, relief valves providing for both the general and specific applications set forth above have taken various forms. Some have used frangible discs which rupture at a predetermined pressure, others have utilized shear pins which fail in shear when subjected to a predetermined pressure, still others have utilized an external power source for operation of the valve, and many have been the more familiar spring-biased relief valves. All of the aforementioned types of relief valves possess certain inherent defects. For example, frangible discs which rupture when subjected to a predetermined pressure inherently require a very wide tolerance zone of operating pressures because of their sensitivity to temperature change and further require critical manufacturing techniques and metallurgical control. Valves which employ shear pins to restrain a valve member until a predetermined pressure is reached likewise require critical manufacturing techniques and metallurgical control as well as a large tolerance zone of operating pressures. Externally powered valves require an energy package and an operating mechanism, and in consequence, the actual port provided constitutes a relatively small part of the total volume and weight associated with the system. Also, since an energy package, an actuating device, and a valve are required, three devices are required to function reliably to achieve one essential function. Finally, conventional spring-biased relief valves are subject to chattering and provide a relatively small port size when the applied pressure is only slightly in excess of the pressure preset for opening of the valve. Manifestly, it would be highly desirable if a self-energized relief valve could be provided which embodied the advantages possessed by the aforementioned types of prior art valves without the inherent incorporation therein of the aforedescribed disadvantages of the prior art valves.

It is therefore an object of the present invention to provide a new and improved self-energizing relief valve.

It is another object of the present invention to provide a self-energized relief valve having a high flow rate capacity to overall size ratio.

It is a further object of this invention to provide a relief valve which derives its operating power from the pressure it is restraining which precludes power requirements from becoming excessive irrespective of the magnitude of the pressures involved.

It is yet another object of the present invention to provide a self-energized relief valve in which the energy needed to operate the valve is independent of the pressure restrained.

It is a still further object of this invention to provide a self-energized relief valve which is light weight, requires relatively few parts and components, and is not sensitive to ambient temperature changes.

With these and other objects in view, the present invention contemplates a self-energized, pilot-operated relief valve comprising a housing having a pair of chambers with an interconnecting passage formed therein. Inlet and outlet ports are formed in the housing in communication with one of these chambers and a valve plug is disposed in this chamber to normally preclude fluid communication between the inlet and outlet ports. A pilot valve having an adjustable spring bias is disposed in the other chamber and is urged in a direction normally closing the interconnecting passage. A plurality of ports are formed in the housing connecting the chamber containing the valve plug with the chamber containing the pilot valve in back of the sealing surface of the pilot valve. Additional porting is provided in the valve plug itself to permit ambient fluid to flow through the inlet, the porting, and the interconnecting passage into contact with the pilot valve. A shear member is disposed in the outlet port and normally precludes any longitudinal movement of the valve plug with respect to the housing. When the ambient fluid pressure exceeds the preset pressure of the pilot valve, the pilot valve will open allowing the ambient fluid to flow into the pilot valve chamber and then to the interconnecting ports against the back of the valve plug. The unbalanced force produced on the valve plug by the fluid in the interconnecting ports will cause the shear member to fail in shear and the valve plug to be ejected through the outlet port, thus opening the valve.

Figure 2:
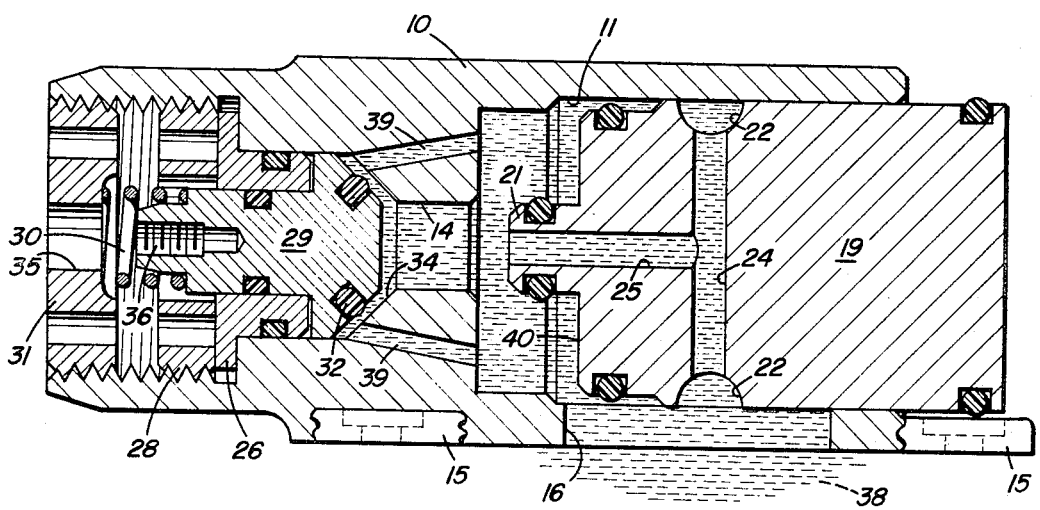

Other objects, advantages and novel features of the invention will become readily apparent upon consideration of the following detailed description when read in conjunction with the accompanying drawings wherein:

FIG. 1 is a longitudinal section through a pilot-operated relief valve embodying the principles of the present invention and illustrating the various parts in the normal or fluid restraining position; and FIG. 2 is a view similar to FIG. 1 and illustrates the positions of the various parts of the valve after the pilot valves has opened in response to excessive fluid pressure at the inlet port.

Attention now is directed to the drawings, wherein like numerals of reference designate like parts throughout the several views, and in particular to FIG. 1 for a description of a preferred embodiment of the self-energized, pilot-operated, relief valve of the present invention. The relief valve comprises a housing 10 having a valve plug chamber 11 and a pilot valve chamber 12 formed therein; fluid communication between which is afforded by an interconnecting passage 14. A flange 15 is formed integral with the housing 10 and facilitates a flush mounting of the relief valve on the exterior surface of an underwater ordnance item or the exterior surface of any other pressure vessel which is to be provided with the relief valve. The housing 10 is further provided with an inlet port 16 and an outlet port 18, both of which are in fluid communication with the valve plug chamber 11.

A valve plug 19 is disposed in the valve plug chamber 11 and is adapted to slide longitudinally of housing 10 within the chamber 11. A shear member 20 is positioned across the outlet port 18 and is disposed in apertures formed on opposite sides of the port 18 in the housing 10. The shear member 20 normally holds the valve plug 19 in the position shown in FIG. 1. The valve plug 19 is provided with a reduced portion 21 which projects into the interconnecting passage 14. O-ring seals are provided on the valve plug 19 to preclude undesired flow of the working fluid between the surfaces of the valve plug 19 and the walls of the chamber 11 and passage 14. The valve plug is further provided with a circumferential groove 22, a diametrically disposed port 24 and axially disposed port 25. These interconnecting ports and groove enable working fluid at the inlet port 16 to flow into the interconnecting passage 14.

A valve guide 26 is disposed within the pilot valve chamber 12 and is retained in the position shown in FIG. 1 by means of a retaining ring 28. A pilot valve 29 is slidably disposed in the valve guide 26 and is normally urged to the right (as viewed in FIG. 1) by a compression spring 30 interposed between the pilot valve 29 and an adjusting ring 31. The pilot valve 29 carries a sealing ring 32 which engages a seating surface 34 formed in the chamber 12 and precludes the flow of working fluid from the interconnecting passage 14 beyond the sealing ring 32. Both the valve guide 26 and pilot valve 29 are provided with O-ring seals, as depicted in FIG. 1, to preclude the flow of working fluid to the left (as viewed in FIG. 1), beyond the plane in which they lie, whenever the pilot valve is open. Both the retaining ring 28 and the adjusting ring 31 are provided with radially disposed apertures to facilitate a manipulation by means of a spanner wrench. By threading the adjusting ring 31 in and out, the force applied to the pilot valve 29 by the compression spring 30 may be varied and hence, the fluid pressure in the passage 14 necessary to open the pilot valve can be adjusted. The adjusting ring 31 is also provided with a central aperture 35 and the pilot valve 29 is provided with a threaded aperture 36 to enable the connection of an external actuator to the pilot valve 29 should this be found desirable.

*Operation*

In order that a better understanding of the invention might be had, its mode of operation will now be described. When pressurized fluid 38 is applied to the inlet port 16, the fluid will flow around the groove 22 and through the ports 24 and 25 into the passage 14 and into engagement with the pilot valve 29. The flow of the working fluid beyond this point is precluded by the O-ring on the reduced portion 21 of the valve plug 19 and the sealing ring 32 in engagement with the seating surface 34. The presence of pressurized fluid within the passage 14 causes the application of unbalanced force, equal to the product of the projected area of the reduced portion 21 and the pressure of the fluid, to be applied to the valve plug 19 and which tends to move the valve plug to the right. Movement of the valve plug 19 to the right, however, is precluded by the presence of the shear member 20 in the outlet port 18. The shear member 20 is made sufficiently strong to oppose the unbalanced force which would be produced if the fluid pressure within the passage 14 were the maximum anticipated pressure.

The presence of pressurized fluid within the passage 14 also exerts an unbalanced force on the pilot valve 29 tending to move the pilot valve to the left as viewed is FIG. 1. This force is equal to the product of the projected sealing area, as defined by the sealing diameter of the sealing ring 32, and the pressure of the fluid within the pasage 14. Movement of the pilot valve 29 to the left under the influence of this force is opposed by the compression spring 30. As long as the fluid pressure within the passage 14 is less than the preset operating pressure, as determined by the spring constant of the spring 30 and the position of the adjusting ring 31, the various parts of the valve will remain in the positions shown in FIG. 1.

When, however, the pressure of the working fluid 38 in the passage 14 reaches the preselected operating value, then the force applied to the pilot valve 29 by the working fluid 38 will exceed the force applied to the pilot valve by the compression spring 30 and the pilot valve 29 will then move to the left to the position shown in FIG. 2. This movement breaks the seal between the sealing ring 32 and the seating surface 34 and permits working fluid 38 to flow through the passage 14 into the chamber 12. With the pilot valve forced open, fluid in the chamber 12 can then flow through ports 39 in the housing 10 and into contact with a rear surface 40 on the valve plug 19. Exposure of the surface 40 to the pressurized fluid greatly increases the effective area to which the fluid pressure is applied and hence greatly increases the unbalanced force applied to the valve plug 19. The shear strength of the shear member 20 is such that the valve member 19 can no longer be restrained and the member 20 then fails in shear which permits the valve plug 19 to begin moving to the right. In the embodiment shown, the ratio of effective areas to which pressurized fluid is applied is in excess of 10–1 with the pilot valve in the open and closed position, respectively. Thus a wide tolerance range is available for the shear strength of the shear member 20 and the shear member 20 may be readily designed to restrain the valve plug 19 when the pilot valve 29 is closed and readily fail in shear when the pilot valve opens and a large increase is caused in the unbalance force applied to the valve plug.

Continued movement of the valve plug 19 to the right will cause the surface 40 to pass the lefthand edge of the inlet port 16, as shown in FIG. 2. When this occurs, fluid pressure will be applied directly to the surface 40 rather than through the ports 39. The valve plug 19 will continue moving to the right due to the pressure of the fluid 38 on the surface 40 and will ultimately be completely ejected from the housing 10 through the outlet port 18. When this occurs, the fluid 38 can then flow through the inlet port 16, into the chamber 11, and then out through the outlet port 18. This will enable flooding of the underwater ordnance item to which the valve is attached or the mere relief of pressure if the valve is being used simply as a relief valve.

From the foregoing, it will be readily apparent that the present invention provides a pilot operated relief valve possessing numerous advantages not found in prior art devices. For example, it is of lightweight construction having relatively few parts and components and may be easily adjusted to the desired operating pressure. Since the operation of the valve is nondestructive with the exception of the shear member, the various parts are reusable and this in turn means that the valve can be tested as often as desired. Any manufacturing tolerances that affect operating pressure can be readily compensated for by testing and manual adjustment of the adjusting ring. The valve of the present invention possesses an extremely high ratio of flow rate to overall size. The present valve is not temperature sensitive provided metals of similar coefficient of thermal expansion are used for parts other than the valve plug which can be of almost any material in ordinary temperature ranges. Since the valve derives its operating power from the pressure it is restraining and hence is self-energizing, operating power requirements can never become excessive irrespective of the pressures involved.

It is to be understood that the above-described arrangement is simply illustrative of a preferred embodiment of the present invention. Numerous other arrangements may be readily devised by those skilled in the art to achieve a similar apparatus still embodying the principles of the present invention and falling within the spirit and scope thereof.

What is claimed is:
1. A pilot operated relief valve comprising:
   a hollow housing having inlet and outlet ports formed therein,
   a substantially solid valve plug slidably disposed entirely within the chamber of said housing and normally precluding fluid communication between said inlet and outlet ports, and
   a normally closed spring-biased pilot valve mounted in said housing and responsive to a preselected inlet fluid pressure to move to an open position,
   said valve plug having surface means responsive to inlet fluid pressure when said pilot valve is open to urge said valve plug to an open position,
   said valve plug further having ports which enable application of inlet fluid pressure to said pilot valve to urge said pilot valve to an open position, and
   said housing being provided with porting normally closed by said pilot valve such that upon opening of said pilot valve the inlet fluid pressure is applied to said valve plug to move said valve plug whereby said inlet and outlet ports are placed in fluid communication.
2. A relief valve as defined in claim 1 including a shear member for normally precluding movement of said valve plug, said shear member being of such size as to fail in shear upon opening of said pilot valve and application of the preselected inlet fluid pressure to said valve plug.
3. A relief valve as defined in claim 1 wherein means are provided for adjusting the biasing force applied to said pilot valve.
4. A pilot operated relief valve comprising:
   a housing having a pair of chambers formed therein, said housing being further provided with inlet and outlet ports communicating with a first one of said chambers,
   a substantially solid valve plug slidably disposed entirely within said first chamber and normally precluding fluid communication between said inlet and outlet ports, and
   a normally closed spring-biased pilot valve disposed in the second of said chambers and responsive to a preselected inlet fluid pressure to move to an open position,
   said valve plug having surface means responsive to inlet fluid pressure when said pilot valve is open to urge said valve plug to an open position,
   said valve plug further having ports which enable application of inlet fluid pressure to said pilot valve to urge said pilot valve to an open position, and
   said housing being provided with porting interconnecting said chambers and normally closed by said pilot valve such that upon opening of said pilot valve the inlet fluid pressure is applied to said valve plug to move said valve plug whereby said inlet and outlet ports are placed in fluid communication.
5. A relief valve as defined in claim 4 including a shear member for normally precluding movement of said valve plug, said shear member being of such size as to fail in shear upon opening of said pilot valve and application of the preselected inlet fluid pressure to said valve plug.
6. A relief valve as defined in claim 4 wherein means are provided for adjusting the biasing force applied to said pilot valve.
7. A pilot operated relief valve comprising:
   a housing having a pair of axially disposed chambers and an interconnecting passage formed therein, said housing being further provided with an outlet port formed in one end thereof and communicating with a first one of said chambers and an inlet port traversely disposed in said housing and also in communication with said first chamber,
   a valve plug disposed within said first chamber for longitudinal movement relative to said housing and normally precluding fluid communication between said inlet and outlet ports,
   a pilot valve disposed in the second one of said chambers responsive to a preselected inlet fluid pressure to move to an open position,
   resilient means disposed in said second chamber normally urging said pilot valve into sealing engagement with a seating surface adjacent said interconnecting passage,
   means on said housing for adjusting the biasing force applied to said pilot valve by said resilient means,
   said valve plug being provided with ports which interconnect said inlet and said interconnecting passage whereby inlet fluid may contact said pilot valve to urge said pilot valve to an open position,
   said valve plug further having surface means responsive to inlet fluid pressure when said pilot valve is open to urge said valve plug to an open position,
   said housing being further provided with porting interconnecting said first chamber and said second chamber in back of said pilot valve such that upon opening of said pilot valve the inlet fluid pressure is applied to said valve plug to move said valve plug longitudinally of said housing and out of said outlet port whereby said inlet and outlet ports are placed in fluid communication, and
   a shear member disposed in said outlet port for normally precluding movement of said valve plug,
   said shear member being of such size as to fail in shear upon opening of said pilot valve and application of the preselected inlet fluid pressure to said valve plug.

References Cited
UNITED STATES PATENTS

| | | | |
|---|---|---|---|
| 2,420,370 | 5/1947 | Hamilton | 137—469 |
| 3,026,800 | 3/1962 | Foster | 137—492.5 X |

FOREIGN PATENTS

| | | |
|---|---|---|
| 604,834 | 9/1960 | Canada. |
| 502,717 | 3/1939 | Great Britain. |
| 811,706 | 4/1959 | Great Britain. |
| 26,746 | 12/1932 | Netherlands. |

WILLIAM F. O'DEA, *Primary Examiner.*

R. GERARD, *Assistant Examiner.*